US012781545B2

(12) United States Patent
Kolb et al.

(10) Patent No.: US 12,781,545 B2
(45) Date of Patent: Nov. 3, 2026

(54) LOCKING DEVICE

(71) Applicant: Illinois Tool Works Inc., Glenview, IL (US)

(72) Inventors: Bernd Kolb, Kirchentellinsfurt (DE); Bozidar Batinica, Gärtringen (DE); Matthias Hegwein, Ippesheim (DE); Jan Dvořák, Niederstetten (DE); Prashant Mahajan, Buchen (DE)

(73) Assignee: Illinois Tool Works Inc., Glenview, IL (US)

( * ) Notice: Subject to any disclaimer, the term of this patent is extended or adjusted under 35 U.S.C. 154(b) by 141 days.

(21) Appl. No.: 18/390,895

(22) Filed: Dec. 20, 2023

(65) Prior Publication Data

US 2024/0209659 A1 Jun. 27, 2024

(30) Foreign Application Priority Data

Dec. 23, 2022 (DE) ..................... 10 2022 134 684.6

(51) Int. Cl.
*E05B 81/34* (2014.01)
*E05B 83/30* (2014.01)

(52) U.S. Cl.
CPC .............. *E05B 81/34* (2013.01); *E05B 83/30* (2013.01)

(58) Field of Classification Search
CPC .......... E05B 83/28; E05B 83/30; E05B 83/32; E05B 83/34; B60R 7/04; B60R 7/06; B60R 2011/0005; B60R 2011/0007
See application file for complete search history.

(56) References Cited

U.S. PATENT DOCUMENTS 11,235,659 B2 2/2022 Dvorak
2008/0191494 A1* 8/2008 Carabalona ............ E05B 83/32 292/251.5

FOREIGN PATENT DOCUMENTS

CN 114856331 A 8/2022
DE 102012004078 A1 9/2013
(Continued)

OTHER PUBLICATIONS

Machine translation and numbered paragraphs of JP 2018125188A (Year: 2018).*
(Continued)

*Primary Examiner* — Christine M Mills
*Assistant Examiner* — Christopher F Callahan
(74) *Attorney, Agent, or Firm* — McAndrews, Held & Malloy, Ltd.

(57) ABSTRACT

The disclosure relates to a locking device (1) for locking two components. The locking device (1) having a first device part (1.1) for attachment to the first component and a second device part (1.2) for attachment to the second component. The first device part (1.1) having a locking recess (4) and the second device part (1.2) having a correspondingly formed movably mounted locking element (5). The locking element (5) engaging in the locking recess (4) in a locking position (VS), thereby locking the two parts (1.1, 1.2) of the device together. A drive assembly is coupled to the locking element (5) and configured to move the locking element (5) from the locking position (VS) to a release position (ES) in normal operation (B) in which the locking element (5) does not engage the locking recess (4) thereby releasing the two parts (1.1, 1.2) of the device from each other. An emergency release device is capable of being manually actuated by means of an emergency actuator (7). The emergency release device is capable being configured to move the locking element (5) in an emergency operation (NotB) from the
(Continued)

locking position (VS) to the release position (ES). In normal operation (B), the emergency actuator (7) is decoupled from movements of the drive assembly and the locking element (5).

19 Claims, 4 Drawing Sheets

(56) References Cited

FOREIGN PATENT DOCUMENTS

| | | | | | |
|---|---|---|---|---|---|
| DE | 102019129887 | A1 | | 5/2021 | |
| DE | 202021102424 | | | 5/2021 | |
| DE | 202021106071 | | | 12/2021 | |
| EP | 095895681 | | | 11/2001 | |
| JP | 2018125188 | A | * | 8/2018 | ........... H01R 13/639 |
| WO | WO-2016089806 | A2 | * | 6/2016 | ......... E05B 47/0012 |
| WO | 2018143184 | A1 | | 8/2018 | |

OTHER PUBLICATIONS

Numbered paragraphs of WO 2016089806 (Year: 2016).*
Office Action dated Sep. 18, 2023 in German application No. 10 2022 134 684.6 (7 pages).

* cited by examiner

LOCKING DEVICE

RELATED APPLICATION

The present application claims the benefit of German Patent Application No. DE 10 2022 134 684.6, filed Dec. 23, 2022, titled "Locking Device," the contents of which are hereby incorporated by reference.

BACKGROUND

An actuating device is known from the prior art, as described in DE 10 2012 004 078 A1. The actuating device for a flap mounted on a trough of an automobile so as to be movable between a closed position and an open position comprises a first actuating part and a second actuating part, which are configured to engage with one another in a direction of movement. The actuating device also comprises locking means with a locking recess provided on the first or second actuating part and a locking element provided on the other actuating part. The locking element engages in the locking recess during engagement of the actuating parts and thus holds the actuating parts together in a locking position. The locking recess is sufficiently large so that, in the locking position, a relative movement between the locking element and the locking recess in the direction of movement of the actuating parts and thus a corresponding relative movement of the actuating parts in their direction of movement relative to one another is possible. The actuating device further comprises a sensor device which is configured to detect a relative movement between the locking element and the locking recess in the direction of movement in the locking position.

Despite various advancements to date, it would nevertheless be desirable to provide an improved locking device.

SUMMARY

The present disclosure relates generally to a locking device, substantially as illustrated by and described in connection with at least one of the figures, as set forth more completely in the claims.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
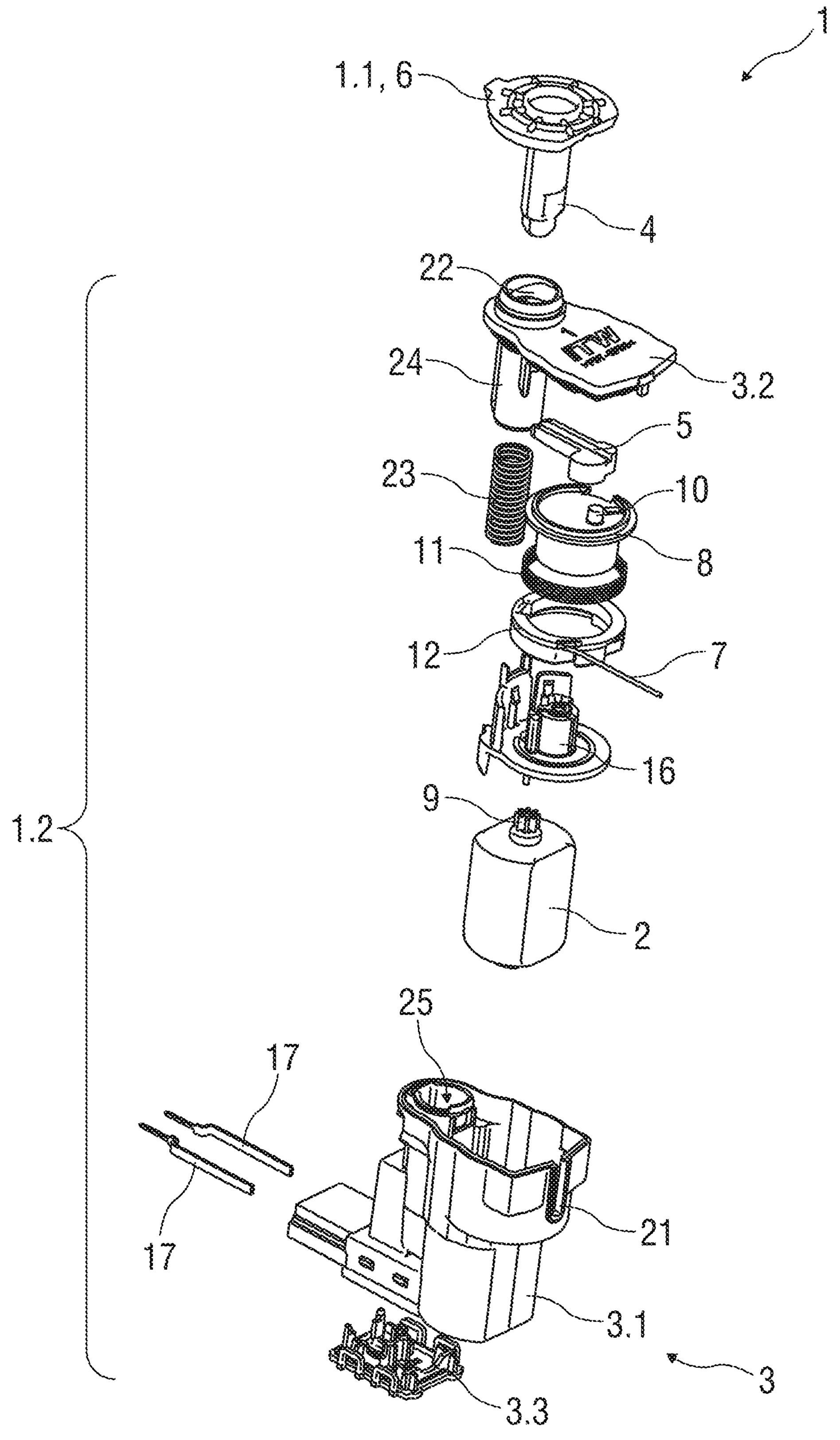
FIG. 1 illustrates is a schematic exploded view of a locking device for locking a closure flap of a trough in a closed state of the closure flap.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

The terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the disclosure. The use of any and all examples, or exemplary language ("e.g.," "such as," or the like) provided herein, is intended merely to better illuminate the disclosed examples and does not pose a limitation on the scope of the disclosure. The terms "e.g.," and "for example" set off lists of one or more non-limiting examples, instances, or illustrations. No language in the specification should be construed as indicating any unclaimed element as essential to the practice of the disclosed examples.

The term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

A locking device for locking a first component to a second component has a first device part provided for attachment to the first component and a second device part provided for attachment to the second component. The first component is, for example, a flap and the second component is, for example, a trough which is to be closed with this flap. In particular, the components are parts of a vehicle. For example, the recess is a glove compartment and the flap is a glove compartment closing flap for closing the glove compartment.

The first device part has a locking recess and the second device part has a corresponding movably mounted locking element, in particular a locking bolt. The locking element engages in the locking recess in a locking position, whereby the two device parts are locked together. This is particularly the case when the two components are arranged in predetermined positions in relation to each other. When the components are designed as a flap, for example a glove compartment closing flap, and a trough, for example a glove compartment, this is therefore the case when the flap closes the trough, i.e. is arranged in a corresponding closing position on the trough.

The locking device also has a drive assembly coupled to the locking element, which is configured to move the locking element in normal operation from the locking position to an release position, in which the locking element does not engage in the locking recess and the two parts of the device are thereby unlocked from each other. This means that the release position is, in particular, a position in which the locking element is pulled out of the locking recess. The movement from the locking position to the release position is therefore in particular a pulling out of the locking element from the locking molding.

In particular, the drive assembly comprises a motor, especially an electric motor. This drive assembly thus enables, for example, remote-controlled release and thus, for example, remote-controlled opening of the recess, in particular the glove compartment, for example by actuating a corresponding control element, which is arranged in the vehicle remotely from the glove compartment, and/or by actuating a remote control inside or outside the vehicle. This actuation activates the motor and thus unlocks the locking device, whereby the flap can be opened manually, for example, or opens automatically, for example by means of spring action and/or due to the force of gravity acting on the flap and/or by means of a drive unit for swiveling the flap.

In order to continue to enable release in emergencies, for example in the event of an electrical power supply failure for the electric motor or in the event of another malfunction, the locking device also has an emergency release device that can be manually actuated by means of an emergency actuator, which is configured to move the locking element from the locking position to the release position in an emergency operation, i.e. also in particular to pull the locking element out of the locking molding.

According to the disclosure, it is provided that the emergency actuator is decoupled from movements of the drive assembly and the locking element during normal operation. In particular, it is thus provided that the emergency actuator in normal operation is not a component of a normal operation drive train for moving the locking element in this normal operation.

The solution according to the disclosure prevents the emergency actuator, which is designed for example as a pull cable, from being moved during normal operation during each release and locking operation and thus, for example, from wearing out or forming a cable loop that could get caught on other parts, which could disrupt their function and/or the emergency release function. The solution according to the disclosure ensures that the emergency actuator always remains in its predetermined position during normal operation.

As already mentioned, the drive assembly has in particular the motor, which is designed in particular as an electric motor. Furthermore, in one possible embodiment, the drive assembly has a transmission wheel coupled to the motor, in particular axially, in particular coupled to a motor output shaft of the motor. For example, the motor output shaft has a gear wheel with an external toothing and the transmission wheel has a corresponding internal toothing and is arranged on the gear wheel of the motor output shaft. Advantageously, the gearwheel has an eccentrically arranged coupling element on a side facing away from the motor, via which the gearwheel is coupled to the locking element. As a result, the locking element can be moved from the locking position to the release position by rotating the transmission wheel in a release direction and can be moved from the release position to the locking position by an opposite rotation of the transmission wheel in opposite locking direction. Herein, the movement of the locking element takes place in particular, at least essentially, radially to the motor output shaft. The coupling element is, for example, a knob-shaped elevation that engages in a corresponding recess of the locking element. The reverse configuration is also possible. In normal operation, it is particularly provided that the transmission wheel is rotated in the release direction by means of the motor. The opposite rotation in the locking direction can also take place by means of the motor or in another manner described below.

In one possible embodiment, the emergency release device has an emergency release ring which is designed and arranged on the transmission wheel in such a way that it is decoupled from movements of the transmission wheel during normal operation. The emergency actuator, which is designed in particular as a pull cable, is advantageously arranged or formed on this emergency release ring. For example, it is molded onto it, in particular in an injection molding process. This design thus ensures that the emergency actuator is decoupled from movements of the drive assembly and the locking element during normal operation, as the emergency release ring does not move during normal operation and therefore the emergency actuator does not move either.

In particular, it is provided that the emergency release ring is rotatably mounted, can be rotated in the release direction by means of the emergency actuator and is designed and arranged on the transmission wheel in such a way that it engages in the transmission wheel by this rotation in the release direction, thereby rotating it in the release direction and moving the locking element from the locking position to the release position. This enables emergency release of the locking device. Herein, the transmission wheel is not driven by the motor, which has for example failed due to a lack of power supply, but is driven by the emergency release ring, which is rotated in the release direction by the actuating element, for example by the pull cable. As the motor is coupled to the transmission wheel, it is also moved during this rotation. However, this does not pose a problem as the motor is de-energized in emergency mode and therefore offers no or only negligible resistance to this movement.

To make this possible, i.e. to enable the emergency release ring to engage in the gear wheel by rotating it in the release direction, thereby rotating it in the release direction and thereby moving the locking element from the locking position to the release position, and furthermore to enable the emergency release ring to be decoupled from movements of the transmission wheel in normal operation, it is provided, for example, that the transmission wheel has a coupling molding which is arranged in an emergency release ring recess of the emergency release ring, wherein the emergency release ring recess is so large that, in normal operation, the coupling molding is able to move in the release direction in this emergency release ring recess until the locking element reaches the release position, and is able to move in the locking direction in this emergency release ring recess until the locking element reaches the locking position, wherein by rotating the emergency release ring by means of the emergency actuator in the release direction, an end of the emergency release ring recess abuts against the coupling molding of the transmission wheel and thereby rotates the transmission wheel in the release direction. The emergency release ring recess in the emergency release ring thus enables the emergency release ring to be decoupled from movements of the transmission wheel during normal operation, as the coupling molding of the transmission wheel then moves freely in the emergency release ring recess in the emergency release ring. During emergency operation, the emergency release ring by means of the end of the emergency release ring recess engages in the transmission wheel, in this case in its coupling molding, by rotating in the release direction and thus takes the transmission wheel along with this rotational movement, i.e. the emergency release ring thereby rotates the transmission wheel in the release direction, whereby the locking element is moved from the locking position to the release position.

As already indicated above, it may be provided that in normal operation the motor is only used to move the locking element into the release position and that the movement of the locking element back into the locking position is achieved in a different way.

This is also particularly advantageous for emergency operation, as it is then also possible to re-lock after emergency release. In particular, if the emergency actuator were designed as a pull cable, by manual actuation by means of the emergency actuator it would not be possible or would only be possible by means of further design measures.

In one possible embodiment, it is therefore provided that the transmission wheel is coupled to a spring element in such a way that the spring element can be tensioned by rotating the transmission wheel in the release direction and the transmission wheel can be rotated in the locking direction by means of a spring force of the tensioned spring element. The return movement into the locking position is thus effected by the spring force of the spring element. This makes it possible to switch off, i.e. de-energize, the motor, in particular the electric motor, after reaching the release position, which advantageously opens the flap. If the locking recess then reaches the locking element again, in particular by closing the flap, the locking element is moved into the locking position by the spring force of the spring element. Thereby, the de-energized motor is also moved. This poses no problem for the spring element, as the motor offers no or only negligible resistance in the de-energized state. The spring element is designed in particular as a torsion spring, i.e. its spring force causes a torque on the transmission wheel. For example, the spring element is designed as a spiral spring with one or more coils.

In one possible embodiment, the emergency release ring, the spring element and the transmission wheel are mounted on a support, which is mounted on the engine, for example. This support has, for example, a locking direction end stop and a release direction end stop for the transmission wheel. For example, this support is designed as an injection molded part, for example as a two-component injection molded part. For example, the two end stops are molded from one of the components and other parts of the support are molded from the other component. The release direction end stop prevents the transmission wheel and thus the locking element from moving too far, especially during normal operation by means of the motor. This means that a simple and, in particular, fast-rotating motor can be used. The use of a stepper motor, for example, which enables the motor to move to an exact end position and thus the locking position to be approached precisely, is therefore not necessary. The locking direction end stop prevents the transmission wheel and thus the locking element from moving too far into the locking position by means of the spring element.

In one possible embodiment, the first device part has a plunger on which the locking recess is formed, and the second device part has a housing in which the locking element is movably mounted. The other components described above, in particular the drive assembly and the emergency release device, with the exception of its emergency actuator, are also conveniently arranged in this housing. The actuating element, designed for example as a pull cable, is expediently led out of this housing, in particular through a corresponding feed-through opening in the housing, and positioned in such a way that it is manually accessible in order to enable manual emergency release.

The housing has an entrance opening for the plunger. The plunger can be inserted into the housing via this entrance opening, in particular in the axial direction of the plunger, in particular by closing the flap. If the locking recess of the plunger reaches the locking element, the locking element is moved into the locking recess in the manner described above and thus moved into the locking position.

In order to make this possible in a simple manner and, in particular, to prevent the locking element from being moved outside the locking recess into the locking position, i.e. into a position of the locking element corresponding to this locking position, it is provided, for example, that a bolt pretensioned in the direction of the inlet opening by means of a spring element designed as a coil spring, for example, is arranged in the housing. When the locking element and the plunger are locked together, this bolt is preloaded by means of the spring element against a free end of the plunger.

This ensures that release, i.e. after the locking element has been moved out of the locking recess, pushes the plunger out of the housing by means of the spring-loaded bolt, which opens the flap at least partially. It can then be fully opened, for example manually, as described above, by means of spring action and/or due to the force of gravity acting on the flap and/or by means of a drive unit for swiveling the flap. Due to this movement of the plunger out of the housing and the spring-loaded movement of the bolt in the direction of the entrance opening, the locking element cannot move back in the manner described above, i.e. it cannot move into the locking position, but instead abuts against the bolt. This allows the plunger to be re-inserted into the housing, which is not blocked by the locking element. When the flap is closed, the plunger is inserted into the housing and pushes the bolt in the direction of the spring element, which is thereby tensioned. When the locking recess in the plunger reaches the locking element, the latter is moved into the locking position as described above and thus moved into the locking recess of the plunger, thereby re-establishing the locking mechanism.

Embodiments of the locking device may have various combinations of the features described in this patent application.

For example, in one embodiment of the locking device, it is provided that the locking device for locking a first component to a second component, in particular for locking a glove compartment lid to a glove compartment of a vehicle, has the following: a first device part provided for attachment to the first component and a second device part provided for attachment to the second component, wherein the first device part has a locking recess and the second device part has a movably mounted locking element configured to correspond thereto, wherein the locking element engages in the locking recess in a locking position and the two device parts are thereby locked together, a drive assembly coupled to the locking element, which is configured to move the locking element in normal operation from the locking position into a release position in which the locking element does not engage in the locking recess and the two device parts are thereby unlocked from one another, wherein the drive assembly has a motor with a motor output shaft and a transmission wheel coupled to the motor output shaft, and an emergency release arrangement which can be manually actuated by means of an emergency actuator and which is configured to move the locking element in an emergency operation from the locking position into the release position, the emergency actuator being decoupled in normal operation from movements of the drive assembly and of the locking element, the emergency release device having an emergency release ring which is designed and arranged on the transmission wheel in such a way that in normal operation it is decoupled from movements of the transmission wheel, and the emergency release ring being rotatably mounted and being rotatable by means of the emergency actuator in a release direction and being designed and arranged on the transmission wheel in such a way that it engages in the transmission wheel by this rotation in the release direction and thereby rotates the transmission wheel in the release direction and thereby moves the locking element from the locking position into the release position.

On the basis of FIGS. 1 to 10, a locking device 1 is described below, which allows release by means of a motor 2 designed as an electric motor in normal operation B, and manual release in emergency operation NotB, for example, in the event of a failure of an electrical power supply to the motor 2.

FIG. 1 shows an explosion diagram of this locking device 1.

Figure 2:
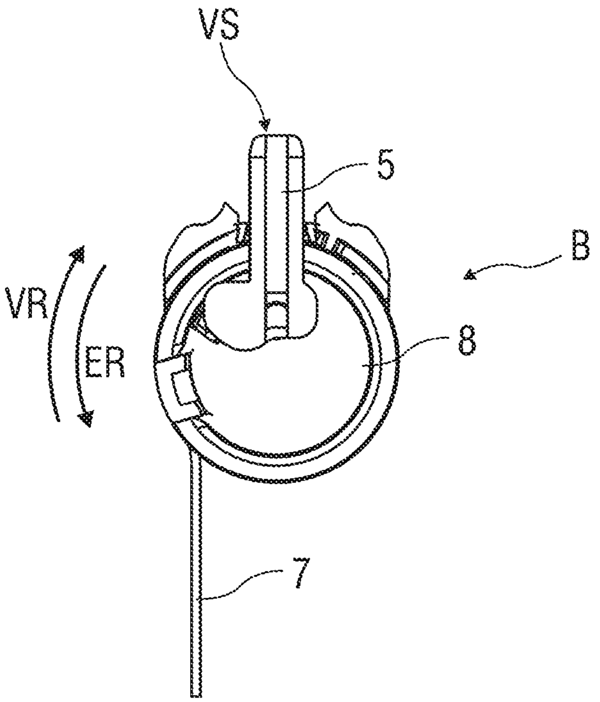
FIG. 2 illustrates is a schematic top view of a front side of a second device part of the locking device without housing in a locking position.
Figure 3:
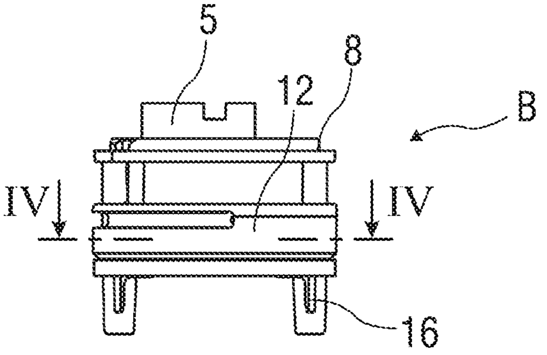
FIG. 3 illustrates is a schematic side view of the second part of the locking device without housing in the locking position.
Figure 4:
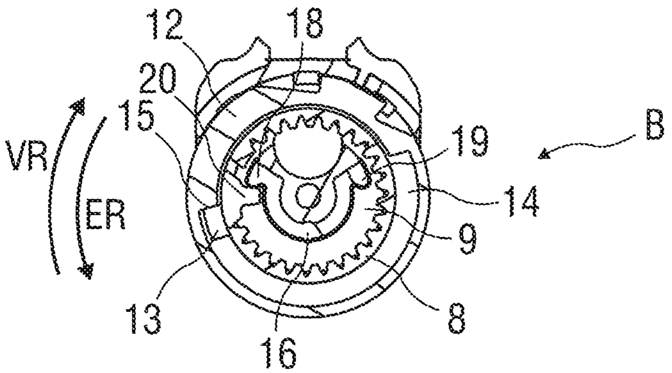
FIG. 4 illustrates is a schematic sectional view corresponding to sectional plane IV-IV in FIG. 3.
Figure 5:
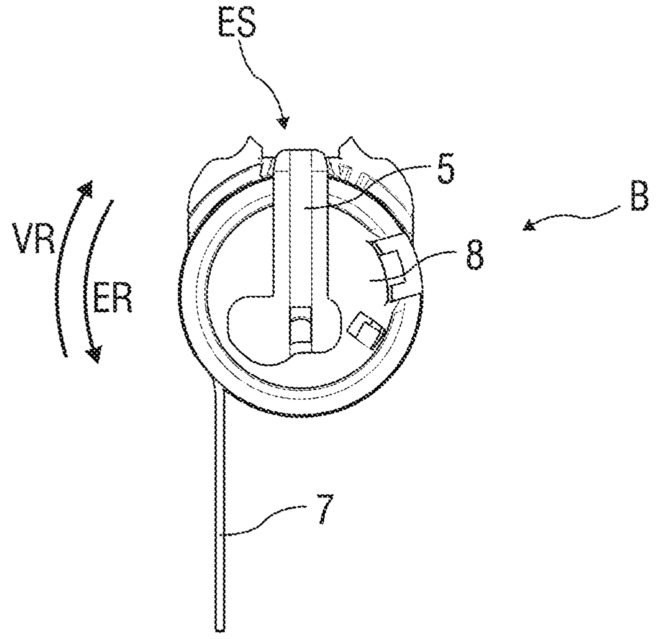
FIG. 5 illustrates is a schematic top view of the front of the second device part of the locking device without housing in a release position set in normal operation by a motor of the locking device.
Figure 6:
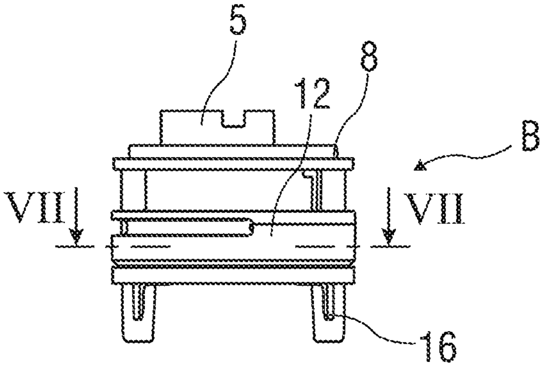
FIG. 6 illustrates is a schematic side view of the second device part of the locking device without housing in the release position set by the motor of the locking device during normal operation.
Figure 7:
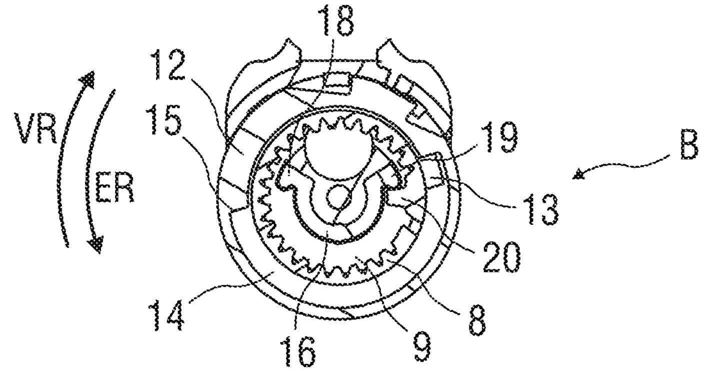
FIG. 7 illustrates is a schematic sectional view corresponding to sectional plane VII-VII in FIG. 6.
Figure 8:
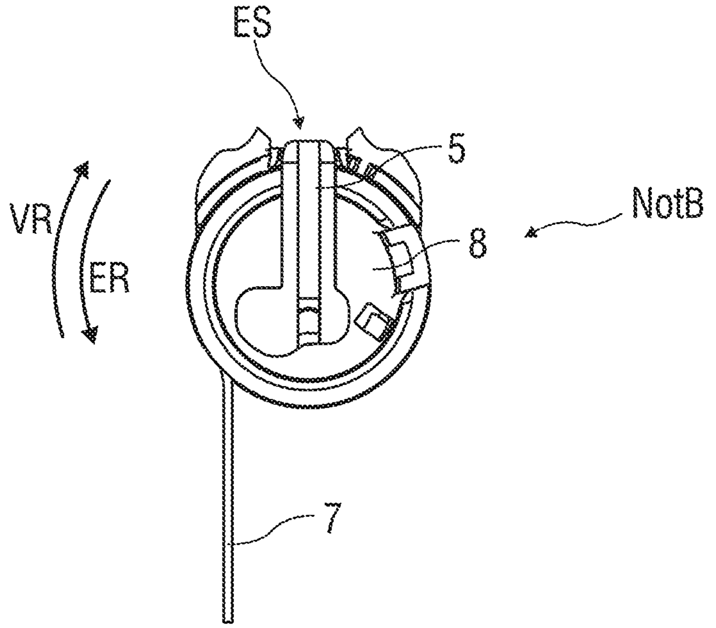
FIG. 8 illustrates is a schematic top view of the front of the second device part of the locking device without housing in a release position manually set in emergency operation.
Figure 9:
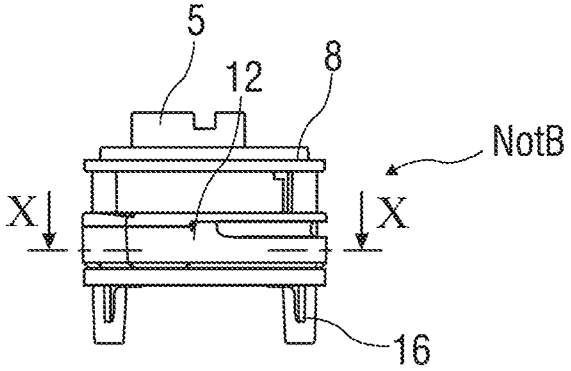
FIG. 9 illustrates is a schematic side view of the second device part of the locking device without housing in the manually set release position in emergency operation.
Figure 10:
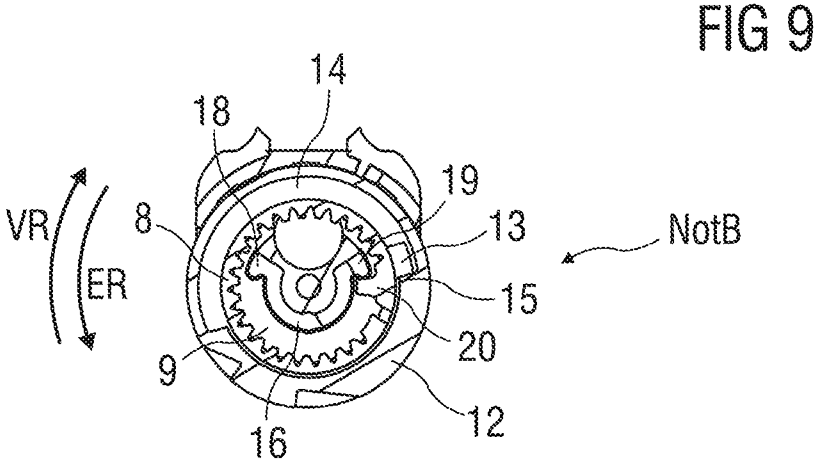
FIG. 10 illustrates is a schematic sectional view corresponding to the sectional plane X-X in FIG. 9.

To illustrate the operation of the locking device 1, FIGS. 2 to 10 respectively show a second device part 1.2 of the locking device 1 without housing 3, FIGS. 2 to 4 show a locking position VS, FIGS. 5 to 7 show a release position ES set by the motor 2 of the locking device 1 in normal operation B and FIGS. 8 to 10 show a manually set release position ES in emergency operation NotB.

The locking device 1 is intended for locking a first component on a second component, the embodiment shown here is intended in particular for locking a glove compartment closure flap in the closed state on a glove compartment of a vehicle.

The latching device 1 has a first device part 1.1 configured to attach to the first component, in particular to the glove compartment flap, and the second device part 1.2 configured to attach to the second component, in particular to the glove compartment.

The first device part 1.1 has a locking recess 4 and the second device part 1.2 has a correspondingly designed movable locking element 5. In the example shown here, the first device part 1.1 is formed as a plunger 6 in which the locking recess 4 is formed in the form of an engagement opening for the locking element 5 formed as a locking latch in the example shown.

The locking element 5 engages the locking recess 4 in the locking position VS shown in FIGS. 2 to 4, whereby the two device parts 1.1, 1.2 are locked together and thus the two components are locked together, i.e. the glove compartment closure flap is locked in the glove compartment when closed. The locking is effected in the example shown here by moving the locking element 5 in the radial direction of the plunger 6 into its locking recess 4. The release is thus effected in the opposite way, i.e. for this purpose the locking element 5 is moved out of the locking recess 4 of the plunger 6 in the radial direction of the plunger 6.

The locking device 1 also has a drive assembly coupled to the locking element 5, which is configured to move the locking element 5 from the locking position VS to the release position ES in normal operation B, in which release position ES the locking element 5 does not engage the locking recess 4, thereby releasing the two device parts 1.1, 1.2 and thus the two components from each other. This drive assembly includes in particular the motor 2, which is designed as an electric motor. This drive assembly thus enables, for example, a remote-controlled release and thus, for example, a remote-controlled opening of the glove compartment closing flap.

In order to continue to enable release in the event of an emergency, for example in the event of a failure of the electrical power supply to the motor 2, the locking device 1 also has an emergency release device, operable manually by means of an emergency actuator 7, which is configured to move the locking element 5 from the locking position VS to the release position ES in emergency operation NotB. In the example shown, the emergency actuator 7 is designed as a pull cable. By manually pulling this cable, the locking element 5 is moved from the locking position VS to the release position ES in the emergency operation NotB in the manner described below.

A particular problem with such an emergency actuator 7 which is designed as a pull cable is that, if it moves continuously during release and locking in normal operation B, it may form a cable loop which may become entangled in other parts, thereby interfering with their operation and/or the emergency release function.

In order to avoid this, the example described and illustrated here provides that the emergency actuator 7 is decoupled from movements of the drive assembly and the locking element 5 in normal operation B. It is therefore provided, in particular, that the emergency actuator 7 in normal operation B is not part of a normal operation power train intended to move the locking element 5 in that normal operation B.

In the example shown, the drive assembly and thus the normal operation drive train has the motor 2 and furthermore a transmission wheel 8 coupled axially with the motor 2, in particular with a motor output shaft of the motor 2. In the example shown, the motor output shaft has a gear wheel 9 with an external gear and the transmission wheel 8 has a corresponding internal gear and is arranged on the gear wheel 9 of the motor output shaft.

The transmission wheel 8 also has an eccentrically arranged coupling element 10 on one side away from the motor 2, through which the transmission wheel 8 is coupled to the locking element 5. In the example shown, this coupling element 10 is formed as a knob-shaped elevation, which engages in a corresponding depression of the locking element 5. As a result, the locking element 5 is movable from the locking position VS to the release position ES by turning the transmission wheel 8 in a release direction ER and movable from the release position ES to the locking position VS by on opposite rotation of the transmission wheel 8 in a locking direction VR.

The movement of the locking element 5 takes place in particular, at least substantially, radially to the motor output shaft. The motor 2, in particular its motor output shaft, and the plunger 6, in whose locking recess 4 the locking element 5 engages in the locking position VS, are thus, at least substantially arranged parallel to each other in this locking position VS.

In the example shown here, the transmission wheel 8 is rotated in normal operation B, as shown in FIGS. 5 to 7, by the motor 2 in the release direction ER, thereby moving the locking element 5 to the release position ES, but the motor 2 is not used for the opposite movement in the locking direction VR and thus for the movement of the locking element 5 to the locking position VS.

In order to make this possible, it is provided that the transmission wheel 8 is coupled to a spring element 11 in such a way that the spring element 11 is tensionable by turning the transmission wheel 8 in the release direction ER and the transmission wheel 8 is rotatable by means of a spring force of the tensioned spring element 11 in the locking direction VR. The return movement to the locking position VS is thus effected by the spring force of the tensioned spring element 11.

The motor 2 is thus switched off, i.e. de-energized, in normal operation B after reaching the release position ES. If the locking recess 4 then reaches the locking element 5, in particular by closing the flap, the locking element 5 is moved to the locking position VS by the spring force of the spring element 11. The de-energized motor 2 is thus moved along. The spring element 11 is designed in particular as a torsion spring, i.e. its spring force causes a torque on the transmission wheel 8. For example, the spring element 11 is designed as a coil spring with one or more coils.

The emergency release device has, in addition to the emergency actuator 7, which is designed as a pull cable, an emergency release ring 12. This emergency release ring 12 is designed and positioned on the transmission wheel 8 in such a way that it is decoupled from movements of the transmission wheel 8 in normal operation B. The emergency actuator 7, which is designed in particular as a pull cable, is arranged or designed on this emergency release ring 12. For example, it is arranged thereon by injection, in particular in an injection moulding process. This design thus ensures that the emergency actuator 7 is decoupled from movements of the drive assembly and the locking element 5 in normal operation B, since in normal operation B the emergency release ring 12 does not move and thus the emergency actuator 7 does not move either.

The emergency release ring 12 is rotatably mounted, rotatable in the release direction ER by means of the emergency actuator 7 and so designed and arranged on the transmission wheel 8 that, by this rotation in the release direction ER, it engages the transmission wheel 8 and thereby rotates it in the release direction ER, thereby moving the locking element 5 from the locking position VS to the release position ES, as shown in FIGS. 8 to 10. This enables emergency release of the locking device 1. Herein, the transmission wheel 8 is not driven by the motor 2, which has failed due, for example, to a lack of energy supply, but is driven by the emergency release ring 12, which is rotated in the release direction ER by means of the emergency actuator 7, for example by means of the pull cable. Since the motor 2 is coupled with the transmission wheel 8, it is moved along with this rotation. However, this is not a problem, since the motor 2 is de-energized in emergency operation NotB and therefore offers no or only negligible resistance to this movement.

In order to enable the emergency release function described, i.e. to enable the emergency release ring 12 to engage the transmission wheel 8 by rotating in the release direction ER, thereby rotating it in the release direction ER, thereby moving the locking element 5 from the locking position VS to the release position ES, and further to enable the emergency release ring 12 to be decoupled from the movements of the transmission wheel 8 in normal operation B, it is provided in the shown embodiment, that the transmission wheel 8 has a coupling molding 13 which is arranged in an emergency release ring recess 14 of the emergency release ring 12, the emergency release ring recess 14 being so large that, in normal operation B, the coupling molding 13, as shown in FIG. 7, is able to move in the release direction ER in this emergency release ring recess 14 until the locking element 5 reaches the release position ES, and is able to move in the locking direction VR in this emergency release ring recess 14 until the locking element 5 reaches the locking position VS, wherein, by rotating the emergency release ring 12 by means of the emergency actuator 7 in the release direction ER as shown in FIG. 10, an end 15 of the emergency release ring recess 14 abuts at the coupling molding 13 of the transmission wheel 8 and thereby rotates the transmission wheel 8 in the release direction ER.

The emergency release ring recess 14 in the emergency release ring 12 thus enables the emergency release ring 12 to be decoupled from movements of the transmission wheel 8 in normal operation B, since the coupling molding 13 of the transmission wheel 8 then moves freely in the emergency release ring recess 14 in the emergency release ring 12. By means of the end 15 of the emergency release ring recess 14 the emergency release ring 12 engages the transmission wheel 8, here in its coupling molding 13, by rotating the emergency release ring 12 in the release direction ER during emergency operation NotB and thus takes the transmission wheel 8 along with this rotational movement, i.e. the emergency release ring 12 thereby rotates the transmission wheel 8 in the release direction ER, whereby the locking element 5 is moved from the locking position VS to the release position ES.

The drive assembly for moving the locking element 5 in normal operation B to the release position ES thus comprises the motor 2 and the transmission wheel 8 and for moving back to the locking position VS the transmission wheel 8 and the spring element 11, wherein the motor 2 is still coupled to the transmission wheel 8 and is thus moved along in a de-energized state. The emergency actuator 7 and the emergency release ring 12 are decoupled therefrom in normal operation B, as described above, and thus do not move along in normal operation B.

The emergency release device for moving the locking element 5 to the release position ES in emergency operation NotB comprises the emergency actuator 7, the emergency release ring 12 and the transmission wheel 8, which is coupled to the emergency release ring 12 in the manner described, by turning the emergency release ring 12 in the release direction ER, which is effected by the manual operation of the emergency actuator 7, i.e. by pulling the pull cable, and which is thereby rotated together with emergency release ring 12 in the release direction ER. This moves the locking element 5 to the release position ES. The motor 2 is still coupled with the transmission wheel 8 and is thus moved in the de-energized state.

In this emergency operation NotB a re-locking is possible, too, because this is also done in the way described above by means of the spring element 11.

Herein, the transmission wheel 8 and, due to its still existing coupling with transmission wheel 8; also the emergency release ring 12 moves back in locking direction VR to the respective initial position. If the locking recess 4 is at the level of the locking element 5, i.e. in the case of the glove compartment the glove compartment closing flap is in the closed position, the locking element 5 is thereby moved to the locking position VS by means of the transmission wheel 8, so that the locking is achieved. Herein, the motor 2 is still coupled with the transmission wheel 8 and is therefore moved along in a de-energized state.

In the example shown, the emergency release ring 12, the spring element 11 and the transmission wheel 8 are mounted on a support 16, which is mounted, for example, on the motor 2. The motor 2, the support 16, the emergency release ring 12, the spring element 11 and the transmission wheel 8 with the locking element 5 coupled thereto are arranged in the housing 3. The housing 3 has a base body 3.1, which is closed with a closing cap 3.2 and a further closing cap 3.3. The support 16 and/or the closing cap 3.2 serve to support and/or center and/or guide the respective component. In particular, the transmission wheel 8 is centered by the support 16. For example, the closing cap 3.2 has a guide for the locking element 5. For example, the support 16 has a support stop for one spring end of the spring element 11, the other spring end of which is coupled to the transmission wheel 8. As a result, the spring element 11 is tensioned by turning the transmission wheel 8 in the release direction ER. On the side of the motor 2, the housing 3 in the shown example is closed by the further closing cap 3.3. The respective closing cap 3.2, 3.3 is connected, for example, to the base body 3.1 by ultrasonic welding or in another way. To electrically connect the motor 2 to an energy source, connection contacts 17 are led out of the housing 3.

In the example shown, the support 16 has a locking direction end stop 18 and a release direction end stop 19 for the transmission wheel 8, in particular for an abutment molding 20 of the transmission wheel 8. For example, this support 16 is formed as an injection molded part, for example as a two-component injection molded part. For example, the two end stops 18, 19 are formed from one of the components and other parts of the support 16 are formed from the other component.

The release direction end stop 19 prevents excessive movement of the transmission wheel 8 and thus of the locking element 5, especially in normal operation B by means of the motor 2. This allows a simple and particularly fast rotating motor 2 to be used, since the motor 2 does not have to enter a respective end position itself, but is stopped by the release direction end stop 19.

The locking direction stop 18 prevents the transmission wheel 8 and thus the locking element 5 from moving too far into the locking position VS by means of the spring element 11.

As mentioned above, in the example shown, the first device part 1.1 has the plunger 6 or is formed as plunger 6, wherein the locking recess 4 is formed on the plunger 6. As also mentioned above, the second device part 1.2 includes the housing 3 in which the locking element 5 is movably mounted and in which the other components described above, in particular the drive assembly and the emergency release device, with the exception of its emergency actuator 7, are arranged. The emergency actuator 7, which is designed as a pull cable, is led out of this housing 3, in particular through a corresponding feed through opening 21 in the housing 3, and is suitably positioned in such a way that it is manually accessible to enable manual emergency release.

The housing 3 has an entrance opening 22 for the plunger 6. This is formed in the example shown in the closing cap 3.2, which also forms a guide for the plunger 6. The plunger 6 can be inserted through this entrance opening 22, particularly in the axial direction of the plunger 6, into the housing 3, in particular into its base body 3.1, in particular by closing the flap. If the locking recess 4 of the plunger 6 reaches the locking element 5, then the locking element 5 is moved into the locking recess 4 in the manner described above and thus moved into the locking position VS.

In order to make this possible in a simple manner and in particular to prevent the locking element 5 from being moved outside the locking recess 4 into the locking position VS, i.e. into a position of the locking element 5 corresponding to this locking position VS, it is provided in the illustrated example that in the housing 3, in particular in the base body 3.1, a bolt 24 is arranged, pre-tensioned by means of a further spring element 23 in the direction of the entrance opening 22. The housing 3, in particular its base body 3.1, has in the example shown a corresponding receiving space 25 for the further spring element 23, the bolt 24 and the plunger 6. The entrance opening 22 is the opening of this receiving space 25. The abovementioned support 16 also has a lateral guide for the bolt 24.

If the locking element 5 and the plunger 6 are interlocked, this bolt 24 is pre-tensioned by means of the spring element 23 against a free end of the plunger 6 which is not attached to the first component. This ensures that, upon release, i.e. after the locking element 5 has been moved out of the locking recess 4, the plunger 6 is pushed out of the housing 3 by means of the spring-loaded bolt 24, thereby opening the flap at least partially. It can then be fully opened, for example, manually, by means of spring action and/or by means of gravity acting on the flap and/or by means of a drive unit for pivoting the flap.

Due to this movement of the plunger 6 out of the housing 3 and due to the spring-loaded movement of the bolt 24 towards the entrance opening 22, the locking element 5 cannot move backwards in the manner described above, i.e. not move into the locking position VS, but abuts the bolt 24. This makes it possible to re-insert the plunger 6 into the housing 3 as it is not blocked by the locking element 5. By closing the flap, the plunger 6 is inserted into the housing 3 and thereby presses the bolt 24 towards the further spring element 23, which is thereby tensioned. If the locking recess 4 in the plunger 6 reaches the locking element 5, the latter is moved to the locking position VS in the above described manner and thus moved into the locking recess 4 of the plunger 6, whereby the locking is restored.

The above-cited patents and patent publications are hereby incorporated by reference in their entirety. While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

LIST OF REFERENCE SIGNS

1 locking device
1.1 first device part
1.2 second device part
2 motor
3 case
3.1 base body
3.2 closing cap
3.3 further closing cap
4 locking recess
5 locking element
6 plunger
7 emergency actuator
8 transmission wheel
9 gear wheel
10 coupling element
11 spring element
12 emergency release ring
13 coupling molding
14 emergency release ring recess
15 end
16 support
17 connection contact
18 locking direction end stop
19 release direction end stop
20 abutment molding
21 feed through opening
22 entrance opening
23 additional spring element
24 bolt
25 receiving space
B normal operation
ER release direction
ES release position
NotB emergency operation
VR locking direction
VS locking position

What is claimed is:

1. A locking device comprising:

a first device part and a second device part, the first device part having a locking recess and the second device part having a movably mounted locking element correspondingly configured to the locking recess, whereby the locking element engages in the locking recess in a locking position and thereby the first device part and second device part of the device are interlocked;

a drive assembly coupled to the locking element, which is configured to move the locking element from the locking position to a release position, in which the locking element does not engage the locking recess, in normal operation, thereby releasing the first device part and second device part of the device from each other;

a motor including an output shaft;

a transmission wheel axially coupled with the output shaft such that the transmission wheel and the output shaft are axially arranged, wherein the transmission wheel is coupled to the locking element, wherein as the transmission wheel rotates, wherein the transmission wheel is moveable from the locking position into the release position by turning the transmission wheel in a release direction and is movable from the release position to the locking position by an opposite rotation of the transmission wheel in a locking direction, wherein the transmission wheel includes an eccentrically arranged coupling element through which the transmission wheel is coupled to the locking element; and an emergency release device operable manually by means of an emergency actuator and configured to move the locking element from the locking position to the release position in emergency mode, wherein the emergency actuator is decoupled in normal operation from movements of the drive assembly and the locking element.

2. The locking device according to claim 1, wherein the emergency release device has an emergency release ring formed and positioned on the transmission wheel in such a way that it is decoupled from the movement of the transmission wheel in normal operation.

3. The locking device according to claim 2, wherein the emergency actuator being arranged or formed on the emergency release ring.

4. The locking device according to claim 3, wherein the emergency release ring is rotatably mounted, rotatable in the release direction by means of the emergency actuator and is so formed and arranged on the transmission wheel that by this rotation in the release direction it engages the transmission wheel and thereby rotates it in the release direction and thereby moves the locking element from the locking position to the release position.

5. The locking device according to claim 4, wherein the transmission wheel has a coupling molding arranged in an emergency release ring recess of the emergency release ring, wherein the emergency release ring recess is so large that, in normal operation, the coupling molding is able to move in the release direction in this emergency release ring recess until the locking element reaches the release position and able to move in the locking direction in this emergency release ring recess until the locking element reaches the locking position, wherein by rotating the emergency release ring by means of the emergency actuator in the release direction, one end of the emergency release ring recess abuts at the coupling molding of the transmission wheel and thereby rotates the transmission wheel in the release direction.

6. The locking device according to claim 1, wherein the emergency actuator is formed as a pull cable.

7. The locking device according to claim 1, wherein the transmission wheel is coupled to a spring element in such a way that the spring element is tensioned by turning the transmission wheel in the release direction and the transmission wheel is rotated in the locking direction by means of a spring force of the tensioned spring element.

8. The locking device according to claim 7, wherein the emergency release ring, the spring element and the transmission wheel are mounted on a support mounted on the motor, the support having a locking direction end stop and a release direction end stop for the transmission wheel.

9. The locking device according to claim 1, wherein the first device part has a plunger on which the locking recess is formed, and the second device part has a housing in which the locking element is movably mounted, the housing having an entrance opening for the plunger, and a bolt preloaded by means of a spring element in a direction of the entrance opening is arranged in the housing.

10. The locking device according to claim 1, wherein the first device part is configured to attach to a glove compartment flap, and wherein the second device part is configured to attach to a glove compartment.

11. A locking device for locking a first component to a second component, comprising:

a first device part configured to attach to the first component and a second device part configured to attach to the second component, the first device part having a locking recess and the second device part having a movably mounted locking element correspondingly configured to the locking recess, whereby the locking element engages in the locking recess in a locking position and thereby the first device part and second device part of the device are interlocked;

a drive assembly coupled to the locking element, which is configured to move the locking element from the locking position to a release position, in which the locking element does not engage the locking recess, in normal operation, thereby releasing the first device part and second device part of the device from each other; and an emergency release device operable manually by means of an emergency actuator and configured to move the locking element from the locking position to the release position in emergency mode, wherein the emergency actuator is decoupled in normal operation from movements of the drive assembly and the locking element, wherein the first device part has a plunger on which the locking recess is formed, and the second device part has a housing in which the locking element is movably mounted, the housing having an entrance opening for the plunger, and a bolt preloaded by means of a spring element in a direction of the entrance opening is arranged in the housing.

12. The locking device according to claim 11, wherein the drive assembly has a motor and a transmission wheel axially coupled to the motor, the transmission wheel having includes on one side away from the motor an eccentrically arranged coupling element through which the transmission wheel is coupled to the locking element so that the locking element is movable from the locking position into the release position by turning the transmission wheel in a release direction and is movable from the release position to the locking position by an opposite rotation of the transmission wheel in a locking direction.

13. The locking device according to claim 12, wherein the emergency release device has an emergency release ring formed and positioned on the transmission wheel in such a way that it is decoupled from the movement of the transmission wheel in normal operation.

14. The locking device according to claim 13, wherein the emergency actuator being arranged or formed on the emergency release ring.

15. The locking device according to claim 14, wherein the emergency release ring is rotatably mounted, rotatable in the release direction by means of the emergency actuator and is so formed and arranged on the transmission wheel that by this rotation in the release direction it engages the transmission wheel and thereby rotates it in the release direction and thereby moves the locking element from the locking position to the release position.

16. The locking device according to claim 15, wherein the transmission wheel has a coupling molding arranged in an emergency release ring recess of the emergency release ring, wherein the emergency release ring recess is so large that, in normal operation, the coupling molding is able to move in the release direction in this emergency release ring recess until the locking element reaches the release position and able to move in the locking direction in this emergency release ring recess until the locking element reaches the locking position, wherein by rotating the emergency release ring by means of the emergency actuator in the release direction, one end of the emergency release ring recess abuts at the coupling molding of the transmission wheel and thereby rotates the transmission wheel in the release direction.

17. The locking device according to claim 11, wherein the emergency actuator is formed as a pull cable.

18. The locking device according to claim 12, wherein the transmission wheel is coupled to a spring element in such a way that the spring element is tensioned by turning the transmission wheel in the release direction and the transmission wheel is rotated in the locking direction by means of a spring force of the tensioned spring element.

19. The locking device according to claim 18, wherein the emergency release ring, the spring element, and the transmission wheel are mounted on a support mounted on the motor, the support including a locking direction end stop and a release direction end stop for the transmission wheel.

* * * * *